(12) United States Patent
Stemp et al.

(10) Patent No.: US 6,401,094 B1
(45) Date of Patent: Jun. 4, 2002

(54) SYSTEM AND METHOD FOR PRESENTING INFORMATION IN ACCORDANCE WITH USER PREFERENCE

(75) Inventors: Mark Richard Stemp, Fairfax, VA (US); Steven B. Hirst, Bensalem; Melodie Waldron, Plymouth Meeting, both of PA (US)

(73) Assignee: Ma'at, Bensalem, PA (US)

( * ) Notice: Subject to any disclaimer, the term of this patent is extended or adjusted under 35 U.S.C. 154(b) by 0 days.

(21) Appl. No.: 09/321,114

(22) Filed: May 27, 1999

(51) Int. Cl.[7] .............................................. C06F 17/30
(52) U.S. Cl. ........................................ 707/10; 707/513
(58) Field of Search ................................ 707/513, 517, 707/501, 102, 10, 104; 709/202, 219

(56) References Cited

U.S. PATENT DOCUMENTS

| | | | |
|---|---|---|---|
| 5,717,923 A | * 2/1998 | Dedrick | 707/102 |
| 5,761,662 A | * 6/1998 | Dasan | 707/10 |
| 5,761,683 A | * 6/1998 | Logan | 707/513 |
| 5,793,368 A | * 8/1998 | Beer | 345/334 |
| 5,793,964 A | * 8/1998 | Rogers | 709/202 |
| 5,793,972 A | * 8/1998 | Shane | 709/219 |
| 5,819,284 A | * 10/1998 | Farber | 707/104 |
| 5,848,396 A | * 12/1998 | Gerace | 705/1 |
| 5,933,841 A | * 8/1999 | Schumacher | 707/501 |
| 5,973,696 A | * 10/1999 | Agranat et al. | 345/760 |
| 6,141,010 A | * 10/2000 | Hoyle | 345/839 |
| 6,295,531 B1 | * 9/2001 | Bae et al. | 707/10 |
| 6,297,819 B1 | * 10/2001 | Furst | 345/733 |
| 6,321,256 B1 | * 11/2001 | Himmel et al. | 705/14 |

* cited by examiner

Primary Examiner—Wayne Amsbury
(74) Attorney, Agent, or Firm—Blank Rome Comisky & McCauley LLP

(57) ABSTRACT

A user accessing a Web site can select the format in which information is presented. The information, instead of being stored in a static HTML document, is dynamically formatted for each user in accordance with that user's personality traits. The information to be displayed is stored in a database server. Client computers running Web browsers do not access that database server directly. Instead, they access it through an application server running server software for dynamic Web pages and also software which implements the business models needed to format the information for each user's personality traits. Those business models and the identity of the browser which each client user is running are used to format the information in from the database server as required. When the user accesses the home page on the application server, the user is presented with a list of links corresponding to personality traits so that the user can view the information as desired. Once the appropriate link is selected, further pages are formatted in accordance with that personality trait. The user can also reselect the personality trait on the fly. A cookie can be set so that the next time the user visits the site, even the home page is formatted in accordance with the personality trait selected.

24 Claims, 9 Drawing Sheets

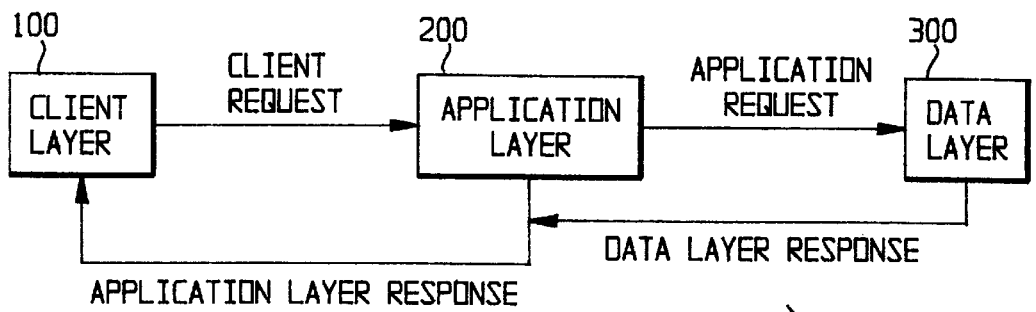
FIG.1
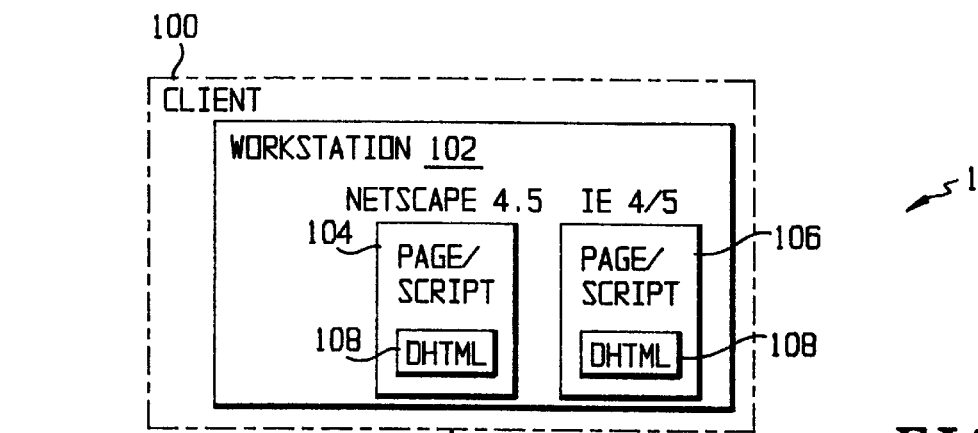
FIG.2
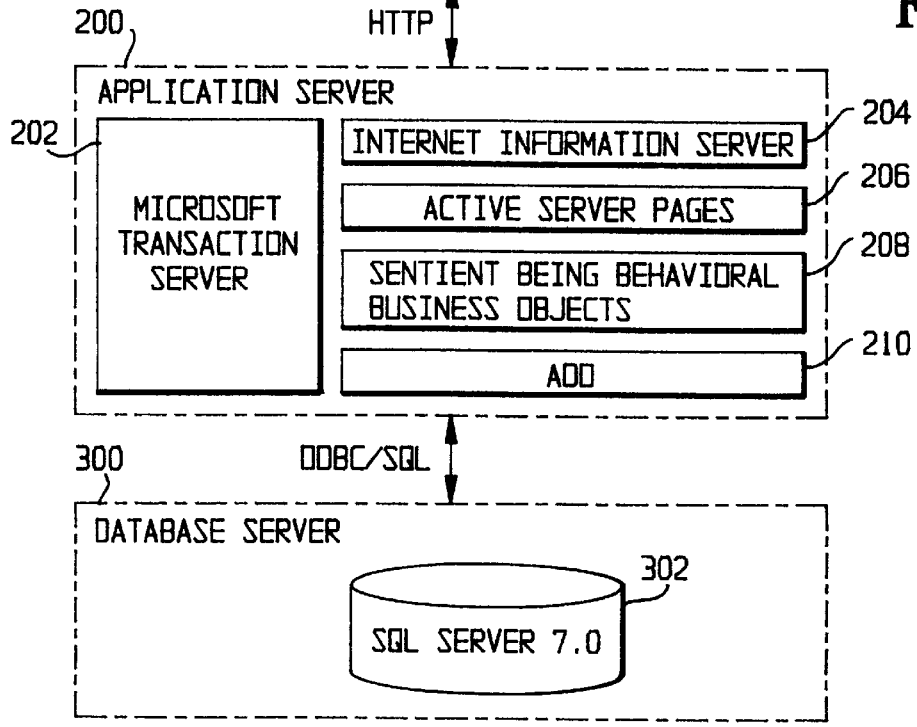

SYSTEM AND METHOD FOR PRESENTING INFORMATION IN ACCORDANCE WITH USER PREFERENCE

BACKGROUND OF THE INVENTION

The present invention is directed to a system and method for presenting information in customizable form and more particularly to a system and method for presenting the information in HTML or other documents which are customized according to a user's personality traits.

Most HTML files, or pages, on the World Wide Web are written in static HTML. Each HTML file and its associated graphics, if any, are stored on a Web server and remain there, unchanged, until the site owner consciously decides to update information. Thus, absent such updates, all users who access a particular Web page, including repeat users, see the same information. Also, they see the information presented in the same way, except for minor details such as different screen resolutions.

Recently, various technologies known collectively as dynamic HTML, or DHTML, have arisen to provide interactive Web pages. The most common such technology is called the common gateway interface, or CGI. A Web page can act as a front end to a CGI script, which can receive information from the user or from another source and process the information on the server to produce a customized Web page, e-mail message or the like. A well known example of CGI is a search engine, which receives search terms from the user, searches a database for the search terms, composes a Web page on the fly listing the hits, and presents that Web page to the user.

A particular use for dynamic HTML is to select information according to a user's preferences and to present the information to the user in HTML or other format. Typically, the user's preferences are stored in a file on a server or in a file, called a cookie, which is stored on the user's computer and which the user's Web browser forwards to the server upon request. The user's preferences can be, e.g., for financial news rather than sports news, for traffic reports on one road rather than on another. When the information is to be presented to the user, the server selects items of information from one or more sources in accordance with the user's preferences, composes one or more HTML files from the information through CGI or the like and supplies the HTML files to the user. Thus, the user receives an electronically customized newspaper.

While such techniques allow different users to be supplied with different information, they present the information to the users in the manner which the Web designers consider appropriate rather than in the manner in which the users consider appropriate. Different users have different personality traits and work best when the information is presented to them in different formats. For example, one user's preferred format may strike a different user as being too dry, too touchy-freely, too hesitant or too pushy.

One known technique for presenting the same information to different users in different formats is to have parallel sets of Web pages with high and low levels of graphics. However, that technique addresses different users' different bandwidths (e.g., a slow modem as opposed to a T1 connection) rather than their personalities. Also, since that technique involves nothing more than providing two or more sets of static HTML pages, the site owner must ensure that any update is applied to the appropriate pages having both or all levels of graphics, thus at least doubling the amount of work in maintaining a Web site. Finally, the user is still limited to formats which the Web designer has already seen fit to provide.

SUMMARY OF THE INVENTION

It will be readily apparent from the foregoing that a need exists in the art for the dynamic formatting of information to suit each user's personality traits. It is therefore a primary object of the invention to provide information over the World Wide Web or the like in a format specified by the user rather than by the Web designer.

It is another object of the invention to format information dynamically in accordance with the user's specified format.

It is a further object of the invention to allow the user to change the specified format and to see the information in the new format immediately.

To achieve the above and other objects, the present invention is directed to a system and method, usable with the World Wide Web or another communication technology, for delivering information to a user in a format selected by the user. The information, instead of being stored in a static HTML document, is dynamically formatted for each user in accordance with that user's personality traits.

The information to be displayed is stored in a database server. Client computers running Web browsers such as Netscape and Internet Explorer do not access that database server directly. Instead, they access it through an application server running known server software for dynamic Web pages and also software which implements the business models needed to format the information for each user's personality traits. Those business models and the identity of the browser which each client user is running can be used to format the information in from the database server as required.

When the user accesses the home page on the application server, the user is presented with a list of links corresponding to personality traits so that the user can view the information as desired. Once the appropriate link is selected, further pages are formatted in accordance with that personality trait. The user can also reselect the personality trait on the fly. A cookie can be set so that the next time the user visits the site, even the home page is formatted in accordance with the personality trait selected.

The application server runs middle tier application server software, which manages the business objects needed to format the information and access the database for each user's behavioral traits. Thus, the user is provided with an optimal viewing experience 100% the time.

BRIEF DESCRIPTION OF THE DRAWINGS

A preferred embodiment of the present invention will be set forth in detail with reference to the drawings, in which:

FIG. 1 is a block diagram showing an overview of a system organized into three layers according to the preferred embodiment;

FIG. 2 is a block diagram showing the three layers of the system of FIG. 1 in greater detail;

DETAILED DESCRIPTION OF THE PREFERRED EMBODIMENT

Figure 4:
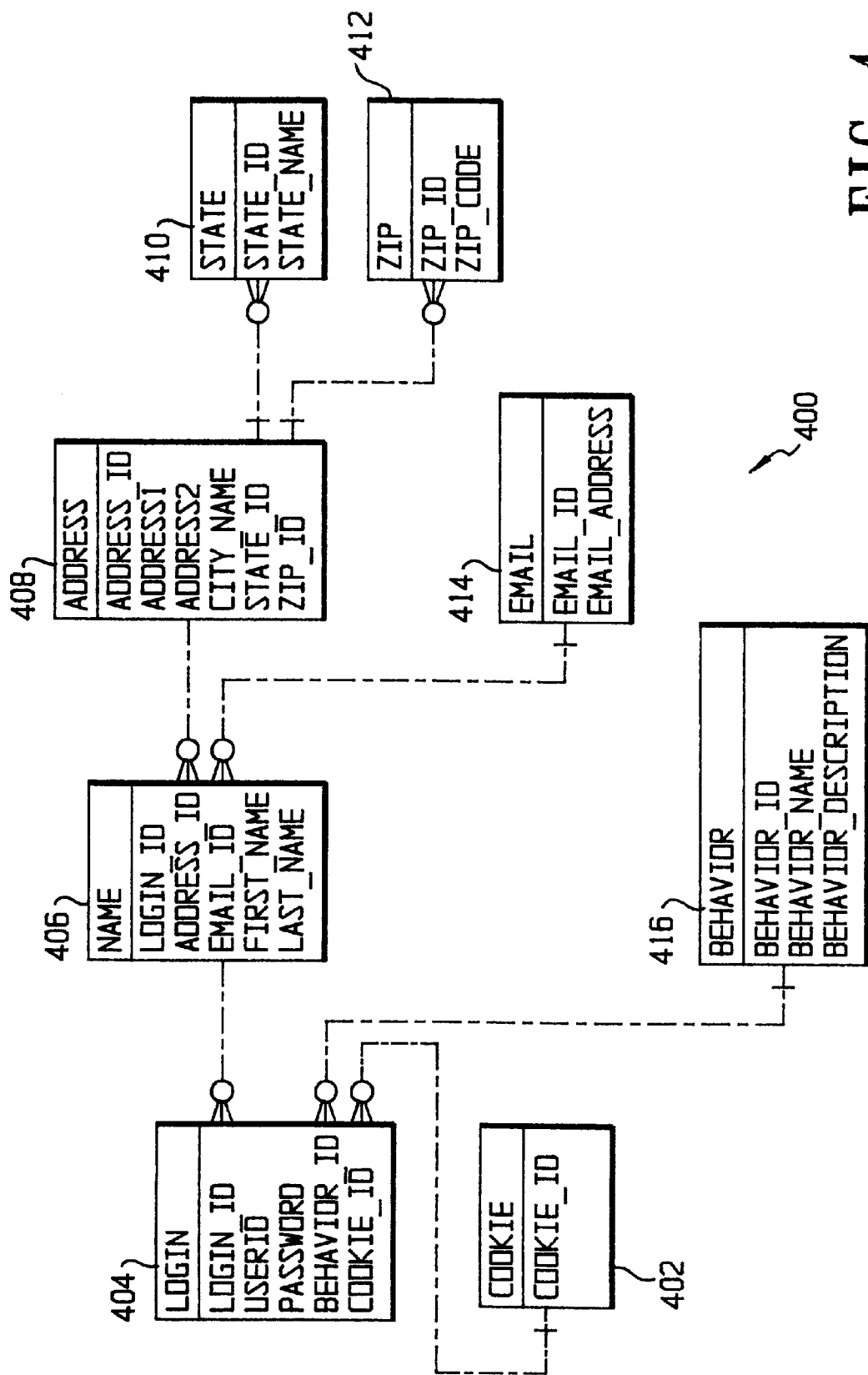
FIG. 4 is a modeling diagram showing a user preferences database used in the system of FIG. 1.

A preferred embodiment will now be set forth in detail with reference to the drawings, in which like reference numerals will be used throughout to refer to like components.

FIG. 1 shows an overview of a system according to the preferred embodiment of the present application. The system 1 is organized as three layers: a client layer 100, an application layer 200 (alternatively known as a middle layer) and a data layer 300. The client layer 100 submits a request to the application layer 200, which in turn sends a request and passes the appropriate parameters into the store procedures on the data layer 300. The data layer 300 process those parameters and returns the requested information to the application layer 200. The application layer 200 formats the information on the fly in accordance with a business object and passes the information thus formatted the client layer 100, which creates the front end for the user.

An object-oriented design (OOD) is extended to the Internet environment and tailored for the users' personality characteristics. The OOD approach utilizes existing Internet technology and programming languages, but expands their usefulness to provide a truly individual interaction with the applications being designed.

The preferred embodiment implements a logical three-tier architecture. There are multiple design methodologies for the client, application and data layers. The particular design hardware is not important, since the concept of morphing the experience to the user can be applied to any platform (Windows 95/98/NT, Macintosh, Unix, Linux, etc.).

FIG. 2 shows the system 1 and its three layers 100, 200, 300 in greater detail. An architecture for each layer will be described for illustrative purposes and should not be construed as limiting. Broadly, the client layer 100 uses a Web browser such as Internet Explorer 4.0 or later or Netscape 4.5 running on Windows 98 or Windows NT 4.0. Of course, the client layer could just as easily be implemented on a Macintosh, a computer running Linux or the like. The application layer 200 runs Microsoft Transaction Server 2.0 (MTS), Internet Information Server and Active Server Pages, although it could also be implemented on a Unix server or the like. Last, the data layer 300 runs SQL Server 7.0, but any database architecture can be applied.

The client layer 100 is typically implemented on a user's desktop computer or other workstation 102 running a Web browser 104, 106, such as Netscape 4.5 or Microsoft Internet Explorer 4.x or 5. Browser recognition is employed to assist in the customized experience created for the user, so that the user sees exactly what the user expects. For example, the browser's ability or inability to handle frames or Java can be detected. The browser 104 or 106 should be able to handle DHTML pages or scripts 108.

The application layer 200 is implemented on any suitably capable server and is based on Microsoft Transaction Server (MTS) 202, Internet Information Server (IIS) 204, Active Server Pages (ASP) 206, the behavioral business objects 208 implemented as Visual Basic 6.0 components, and Active Data Objects (ADO) 210. MTS acts as an object-broker, distributing objects to the client. The MTS version used is 2.0. IIS 4.0 204 is a platform which supports ASP 206, MTS 202, and ADO 210. The behavioral business objects 208 allow the formatting of the information in accordance with the user's personality type. ADO 210 is used for communication between the business objects 210 and the data layer.

The data layer 300 is implemented on any suitably powerful database server and uses a SQL Server 7.0 database 302 which is accessible only through the MTS 202. The database 302 can be any database which a designer determines to be the most robust platform for the intended user environment. SQL Server was used for the sake of conceptual design.

The interaction of users with the system 1 will be described beginning with FIG. 3. It is contemplated that the preferred embodiment will be implemented with four personality types: an amiable user U1, an expressive user U2, an analytical user U3 and a driver user U4. The nature of those four personality types will be described in greater detail below. However, the invention can be scaled to any number of types of user. As noted above, it is preferable that the users U1–U4 not be allowed to access the database 302 directly, but that they be required instead to go through the intermediary of the behavioral object model as implemented in the behavioral business objects 208 in the application layer 200.

The interaction of any of the users U1–U4 with the system 1 is determined in accordance with the user preferences database 400 of FIG. 4. That data structure is established for each user when the user creates an account with the system 1. The handling of new users and of users who wish to change their settings will be explained below with reference to FIG. 5. The database 400 can be stored as part of the database 302.

The arrows represent relationships between tables in the database 400. The database 400 is relational and is highly normalized for scalability and usability. Not all attributes are required fields, and depending on the needs of the consumer, there can be more or less information contained and stored in the database 400. Also, a particular site can store more or fewer data fields, or data fields different from those shown, in accordance with its particular requirements.

When a user accesses the system 1, the user's Web browser 104 or 106 forwards a cookie to the application layer 200. The cookie essentially implements a 1×1 database table 402 whose sole entry is the cookie ID. The cookie ID is applied to a login table 404, which matches the cookie ID with a login ID, a user ID, a password and a behavior ID. In a name table 406, the login ID is matched to an address ID, an e-mail ID, a first name and a last name. In an address table 408, the address ID is matched to first and second address lines, a city name, a state ID and a ZIP-code ID. In a state table 410, the state ID is matched with a state name, while in a ZIP-code table 412, the ZIP-code ID is matched with a ZIP code. In an e-mail table 414, the e-mail ID is matched with an e-mail address. In a behavior table 416, the behavior ID is matched with a behavior name and a behavior description. Thus, the information stored in the cookie allows efficient access to detailed information about the user.

Figure 3:
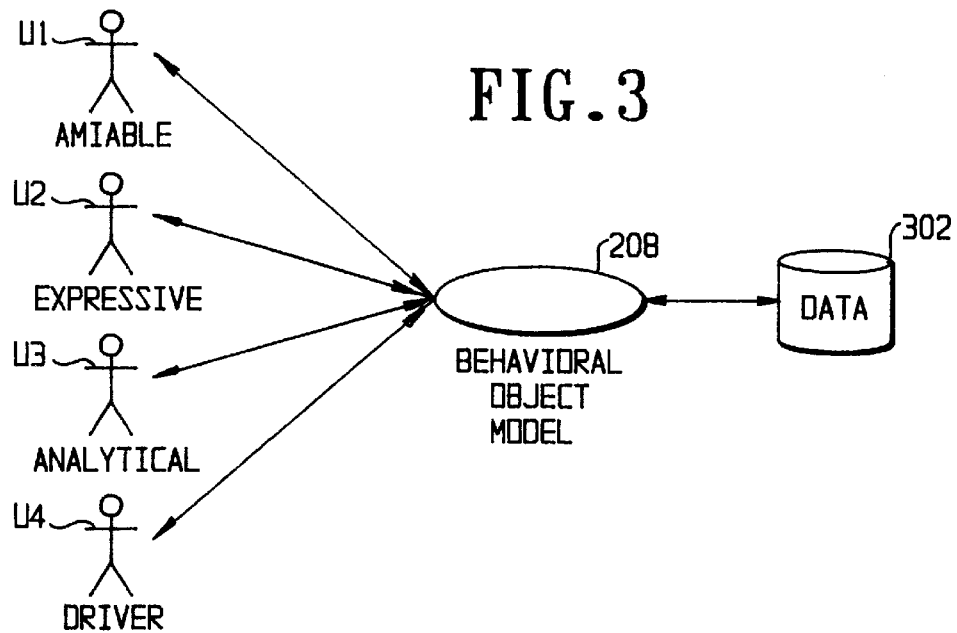
FIG. 3 is a schematic diagram showing the interaction between different users and the system of FIG. 1.
Figure 4A:
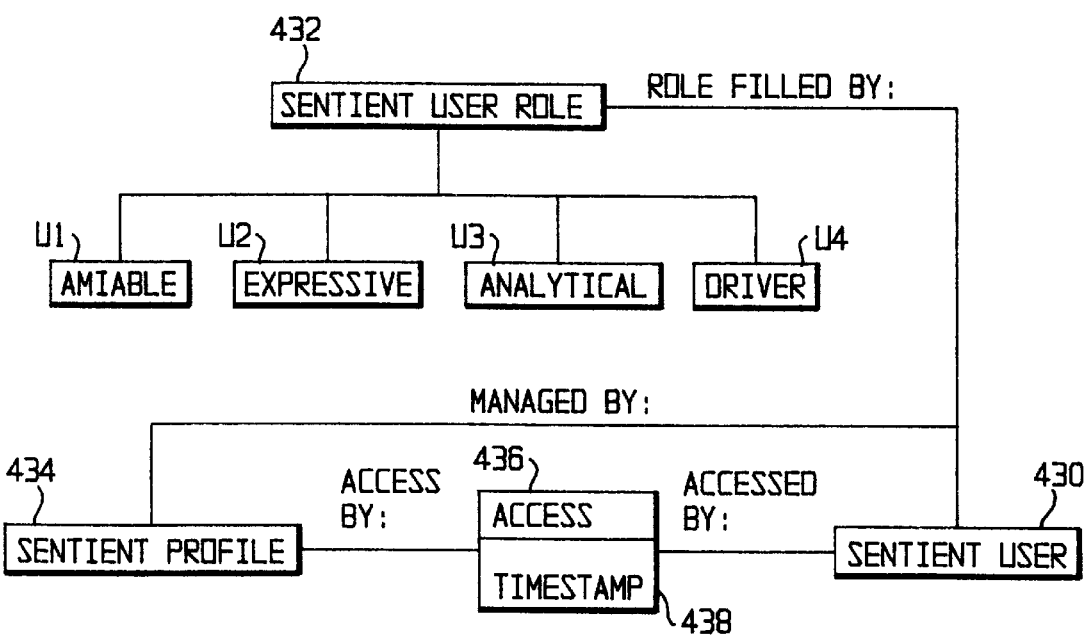
FIG. 4A is a modeling diagram showing the interaction between the different users of FIG. 3 and the database of FIG. 4, FIGS. 5 and 5A are flow charts showing interactions between the system of FIG. 1 and an established user, a new user and a user who wishes to change preferences on the fly.

FIG. 4A shows an overview of the use of the database 400 in communicating with any of the users U1–U4 of FIG. 3. Each user 430 has a user role 432 which, in this illustrative example, is one of the four personality types of FIG. 3. The database 400 defines a profile 434 for each user. When the user accesses the server and is identified as described above, the profile 434 is accessed by an access process 436 which can optionally include a time stamp 438 to identify the time of the user 430's visit Those skilled in the art who have reviewed this disclosure will readily appreciate the ways in which the time stamp 438 can be stored and used. Thus, the user 430 is identified as having a user role 432 corresponding to one of the four personality types U1–U4.

Figure 5:
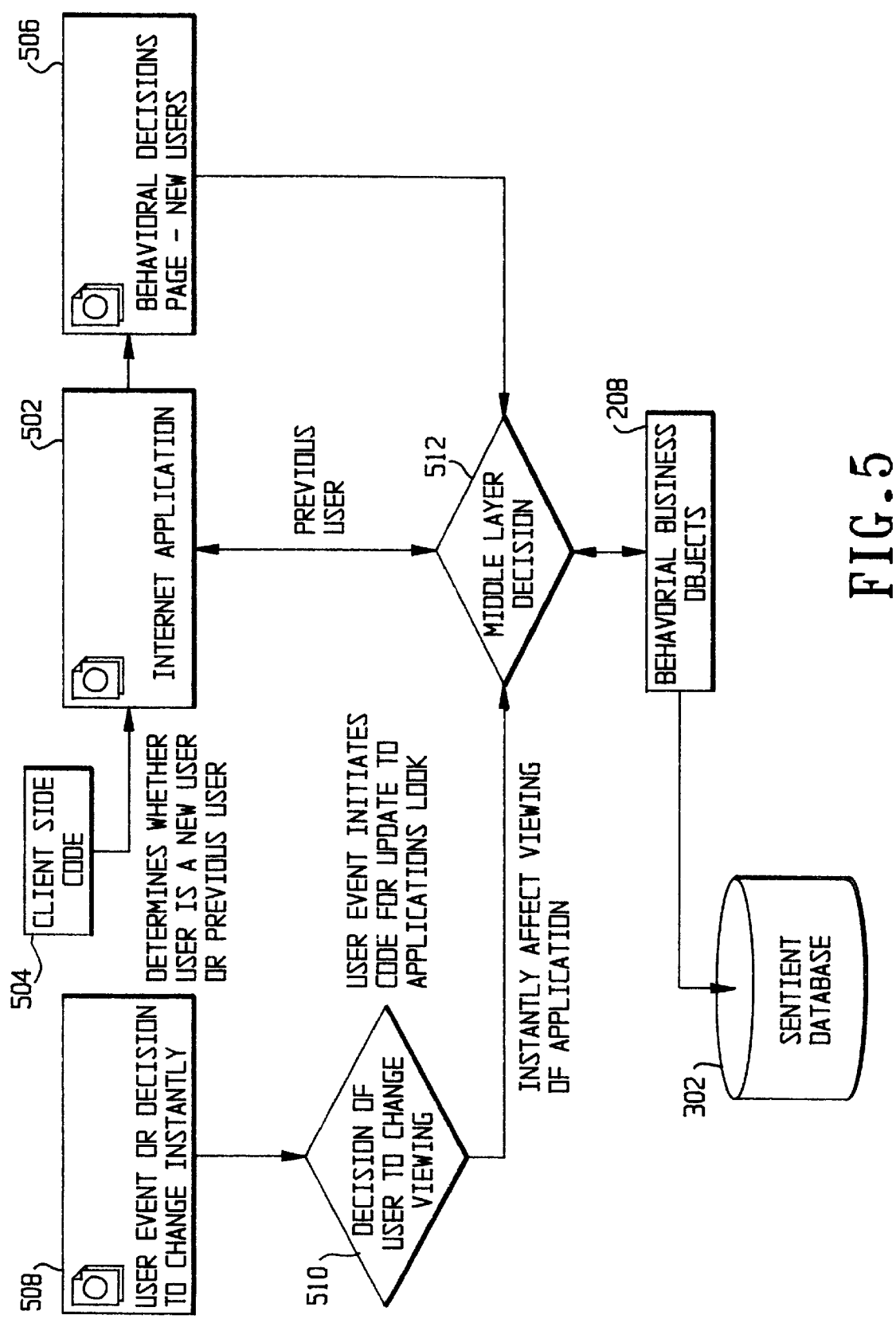
FIG. 5B is a flow chart showing the formatting of raw data into a Web page for viewing by the user in accordance with the user's behavioral characteristic.

FIG. 5 shows the handling of new users and of users who wish to change their settings. When the user accesses the system in step 502, it is determined through client-side code (e.g., the presence or absence of a cookie on the computer 102) whether the user is a new or established user. An established user's settings are retrieved in the manner described above with reference to FIG. 4. A new user is referred in step 506 to a behavioral decisions page in which the user can specify the personality type for which the user wishes to view the site and otherwise set up an account. Of course, if the "new" user is simply an established user who is accessing the site from a different workstation, so that the user's cookie is unavailable, the user can simply log in at that stage.

Once the user has established a preference, the user may wish to change the preference. The pages sent by the middle or application layer 200 may be structured so that there is always a link to allow the user to do so. The word "link" is used broadly to include not only traditional links of the <a href= . . . >variety, but also buttons, Java menu items and anything else which can be actuated by the user to send a request to the application layer 200. Such links can be implemented in many ways, e.g., by client-side scripting such as Javascript or by server-side scripting such as CGI. When the user actuates such a link, the client layer 100 sends a message to that effect to the middle or application layer 200 in step 510.

The application layer decides in step 512 whether step 502, 506 or 510 has been carried out. The result of that decision is used to control the behavioral business objects 208 to present the information in the form desired by the user. For example, when the user changes the preference, the information then being shown and all further information can be re-morphed in accordance with the new setting. Thus, the behavioral business objects mediate the interaction between the user and the database 302 to provide custom-formatted information to the user.

Figure 5A:
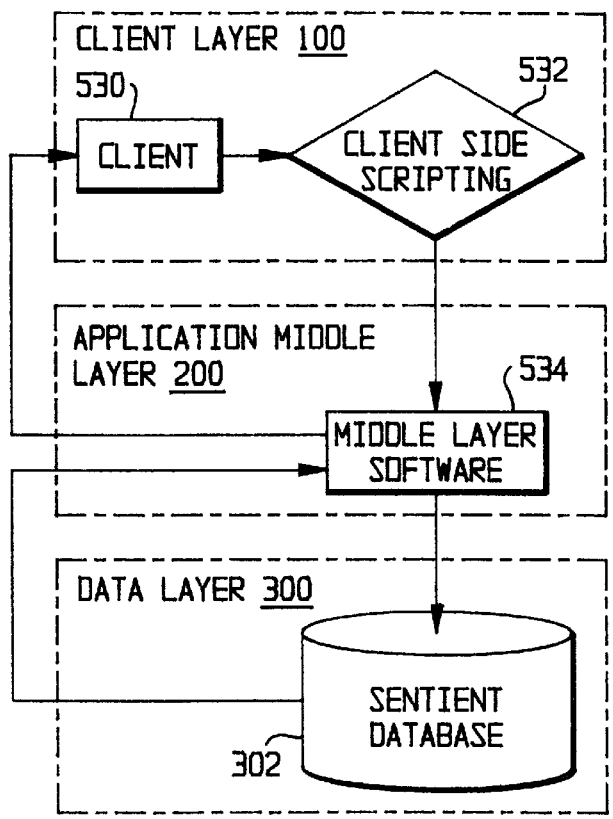

When the user decides to change the preference, the three layers 100, 200 and 300 cooperate as shown in FIG. 5A. In the client layer 100, the client 530 makes a decision to change the profile. Client-side scripting 532, such as Javascript, processes the decision. Alternatively, server-side scripting, such as CGI, could be used. The processed script is passed to the application or middle layer 200. There, the middle layer software 534 receives the processed script, accepts the parameters of the new profile, stores the new parameters into its default variables and uses the default variables to retrieve the behavioral profile associated with the new parameters. The retrieval is made through a request to the database 302 in the data layer 300, which passes the behavioral profile to the middle layer software 534. The application or middle layer 200 then passes the profile and the requested behavioral changes to the client layer 100, thus assuring 100% comfortability for the client 530.

Once the user's preference is established, the preference is used to format the raw data stored in the data layer 300 into a form suitable for viewing by that user. That formatting can be implemented by the suitable configuration of existing technologies. Referring back to FIG. 2, an illustrative example of such existing technologies which can be used is a Microsoft NT specific application design. The application layer 200 uses Microsoft Transaction Server 202 and the Visual Basic behavioral business objects 208 to process the behavioral information. Once the information is processed, the combination of Internet Information Server 204 and Active Server Pages 206 receives the processed behavioral information and dynamically builds the client-side code to adapt to the behavioral characteristic requested. The client side code is the passed to the client layer 100 as an HTML document with embedded JavaScript code to handle any further instantaneous behavioral changes in the manner shown in FIG. 5A.

Such technology can be adapted to any suitable client server environment, including UNIX, LINUX, JAVA, Enterprises Java Beans, and CORBA. The overall theoretical concept is the same.

Figure 5B:
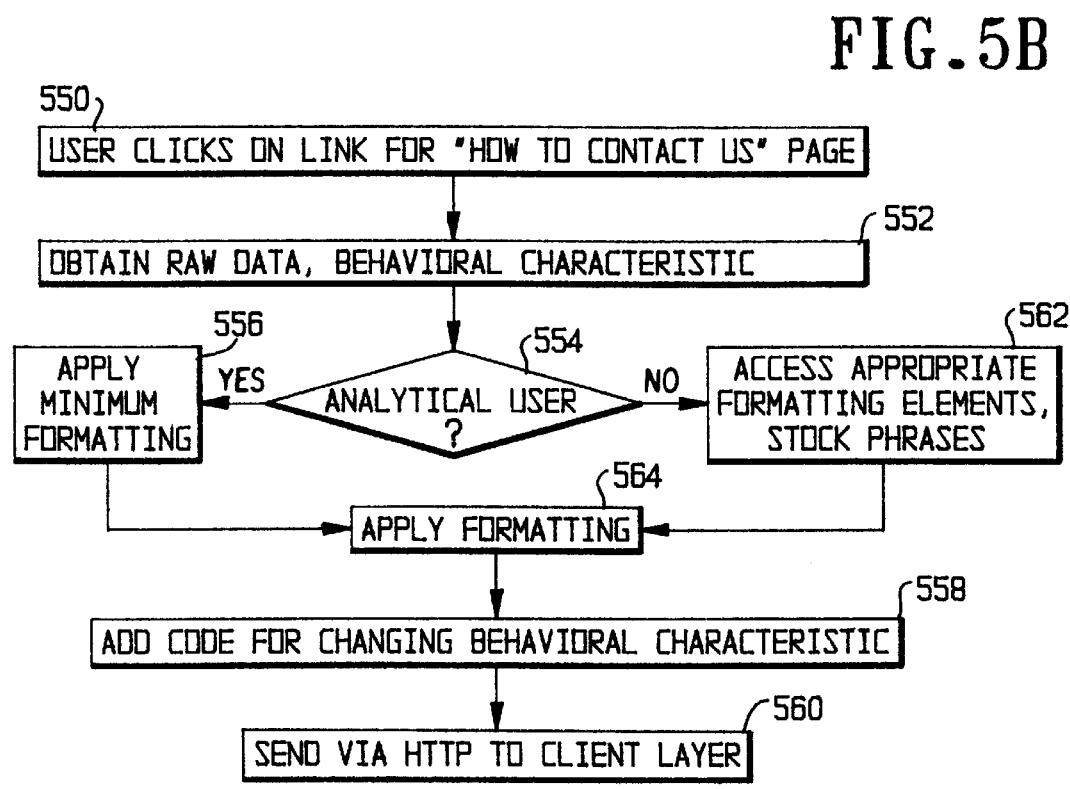

A technique for formatting the raw data into the Web pages which the user sees will now be explained with reference to the flow chart of FIG. 5B. In step 550, the user clicks on the link for the "How to Contact Us" page. The request for the page is sent to the application layer 200, which in step 552 accesses the data layer 300 to obtain the raw data on the company's address, fax number, etc. The application layer 200 also obtains the user's behavioral characteristic in the manner described above and determines in step 554 whether the user is an analytical user.

For an analytical user, the application layer 200 takes the raw data, adds the minimum HTML formatting codes in step 556 to form a Web page (e.g., to place the raw data in bullet format), and in step 558 adds the JavaScript code to let the user change the behavioral characteristic. The resulting Web page is passed in step 560 to the client side 100 so that the user sees a no-frills page.

For the other users, the application layer 200 takes the raw data and in step 562 adds additional formatting elements to conform the resulting page to the behavioral characteristic. The data layer 300 can contain a library of formatting elements (graphics, typographical effects, etc.) and stock phrases, keyed by the behavioral characteristics to which they are appropriate. Also, in step 564, the raw data can be formatted differently, e.g., in paragraph format instead of bullet format. The JavaScript code is also added in step 558, and the resulting Web page is passed to the user via HTTP in step 560.

It is contemplated that the present invention will be implemented with four personality types, based on assertiveness and responsiveness. However, other measures of personality, such as the Myers-Briggs type indicator, could be used instead.

The analytical personality type is control-responsive and ask-assertive. In general, analytical persons:

Are tentative in assertiveness.
Are detail-orientated, and well organized.
Want details
Consider established policies, criteria, and objectives in making decisions.
Prefer an efficient, businesslike sales approach.
Want to understand the whole picture as opposed to the "big" picture.
Are practical and conservative in their business decisions.
Are detail-oriented; rely on a structured approach and factual evidence.

Characteristics of analytical persons include the following:
Task-oriented
Slow paced
Like easy-to-understand structure The amiable personality type is ask-assertive and emotional-responsive. In general, amiable persons:
Like warm, cooperative, and deliberate environments.
Are sensitive to the needs of others in the buying process.
Want to feel assured that the products and services offered will be accepted by their organization.
Want to be assured that others will support their buying decision and that the company is a firm keeper of commitments.
Characteristics of amiable persons include the following:
Supportive, comfortable actions
Want to be secure
Slow paced
Like essay-style reading
Procrastinate actions
Like to relate
Dislike conflict, no heavy sales pitch The expressive personality type is tell-assertive and emotional-responsive. In general, expressive persons:
Are fast-paced, outgoing, and enthusiastic.
Love to be entertained while getting information.
Are innovative; willing to take risks.
Have a vision of the future and are responsive to products and services that help them achieve their vision.
Are concerned about the quality of solutions and their implementation.
Openly offer information.
Love to collaborate with finding and implementing quality solutions that meet their needs.
Want to see the "big picture" before probing for details.
Characteristics of expressive persons include the following:
Spontaneous actions
Want approval
Fast paced
Quick decisions The driver personality type is control-responsive and tell-assertive. In general, driving persons:
Are direct and to the point. Are controlling, forceful and results orientated.
Tend to have a high sense of task urgency.
Have clear objectives and keep focused on such.
Respond to demonstrations that their products or services can effectively and efficiently achieve results.
Want to be told of options and provided with probabilities of success.
Act quickly after careful consideration of options.
Characteristics of driving persons include the following:
Straightforward actions
Want to achieve
Task oriented
Fast paced
Like to control
Dislike inaction It is contemplated that the present invention will be implemented with the above four personality types and four levels of graphics, for sixteen display formats. However, any number of formats can be provided. For example, the personality type and level of graphics can be selected with slider bars for an infinite number of display formats. Also, different format criteria, such as language or the choice of frames or no frames, can be used.

Examples of the preferred embodiment as accessed by persons of varying personality types will now be described with reference to FIGS. 6–9.

Figure 6:
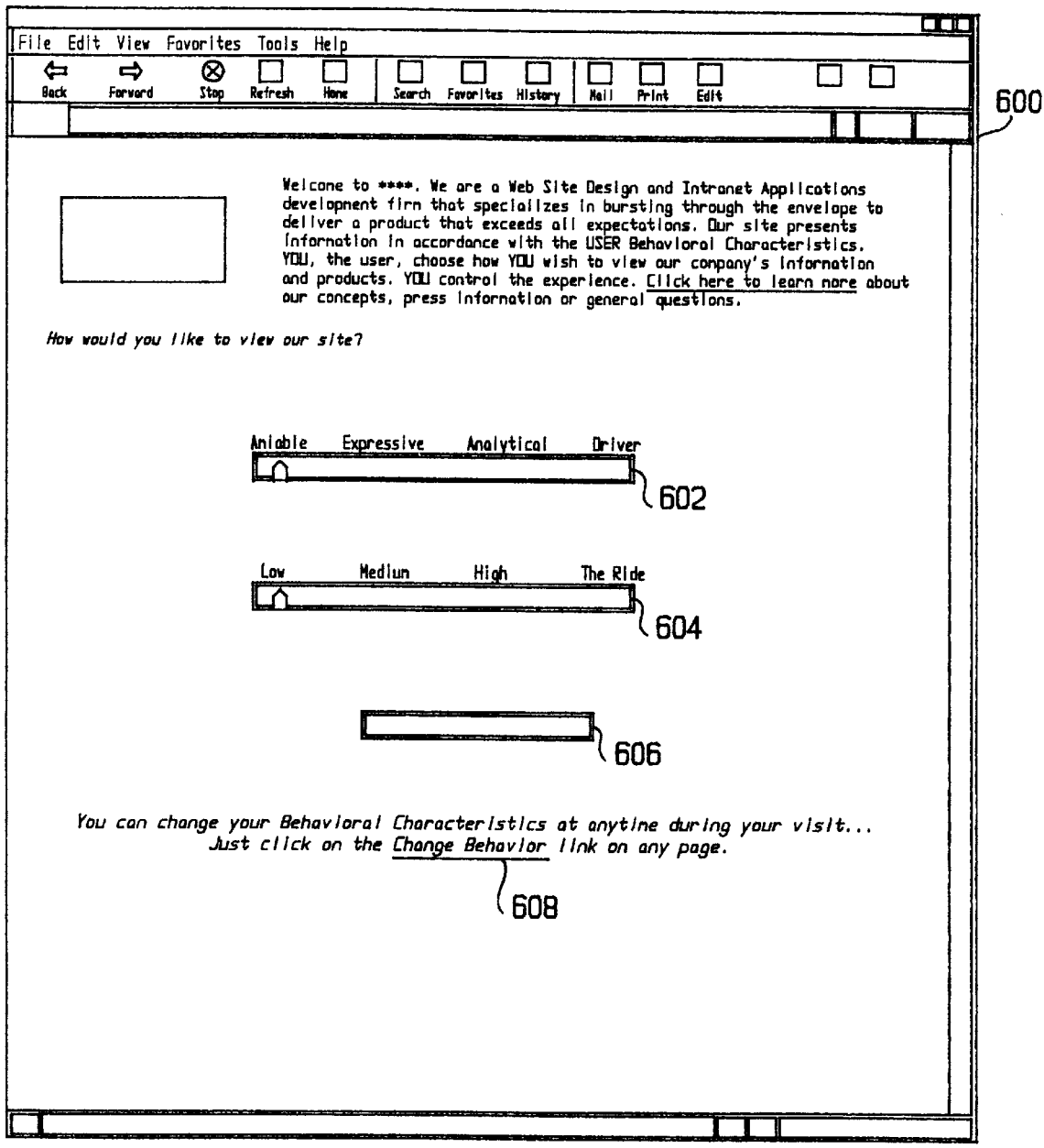
FIG. 6 is a screen shot showing a home page displayed by the system of FIG. 1.

A home page 600 accessed by a new user is shown in FIG. 6. The home page 600 includes basic information on the company and offers two slider bars 602, 604 to allow the user to select the form in which subsequent pages are to be displayed. The first slider bar 602 allows the user to select from among the four personality types described above, while the second slider bar 604 allows the user to select four levels of graphics. The user confirms both selections by clicking the "Accept Characteristics" button 606. The home page 600 also advises that the user can change the characteristics at any time by clicking on the "Change Behavior" link 608 on any page. That link functions as described above.

Figure 7:
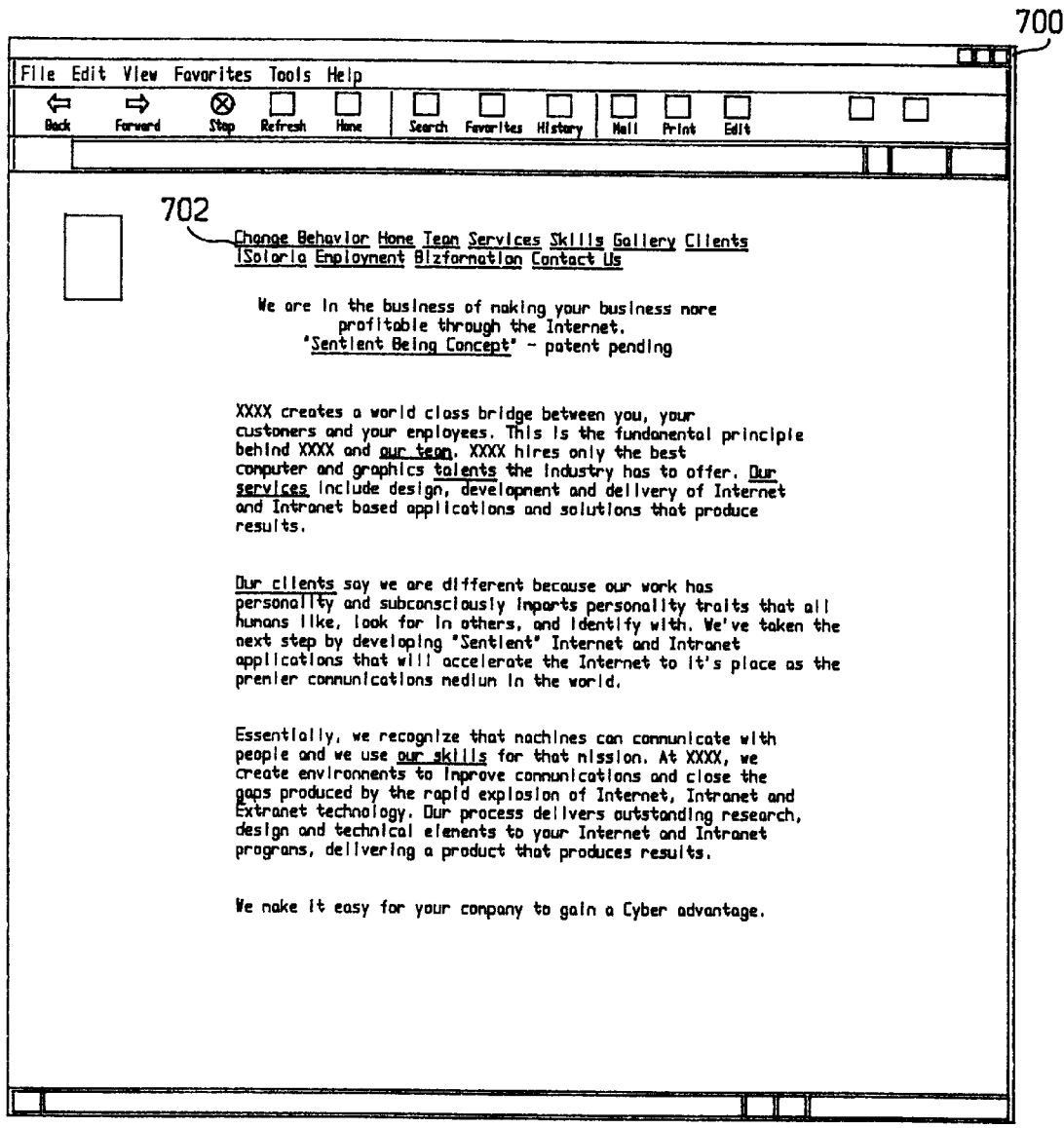
FIGS. 7–9 are screen shots showing presentations of information in accordance with three preferences which can be selected through the home page of FIG. 6.

An analytical or driver user sees a page such as the page 700 shown in FIG. 7. The page 700 includes information in text form with minimal formatting. It also includes links such as the "Change Behavior" link 608.

Figure 8:
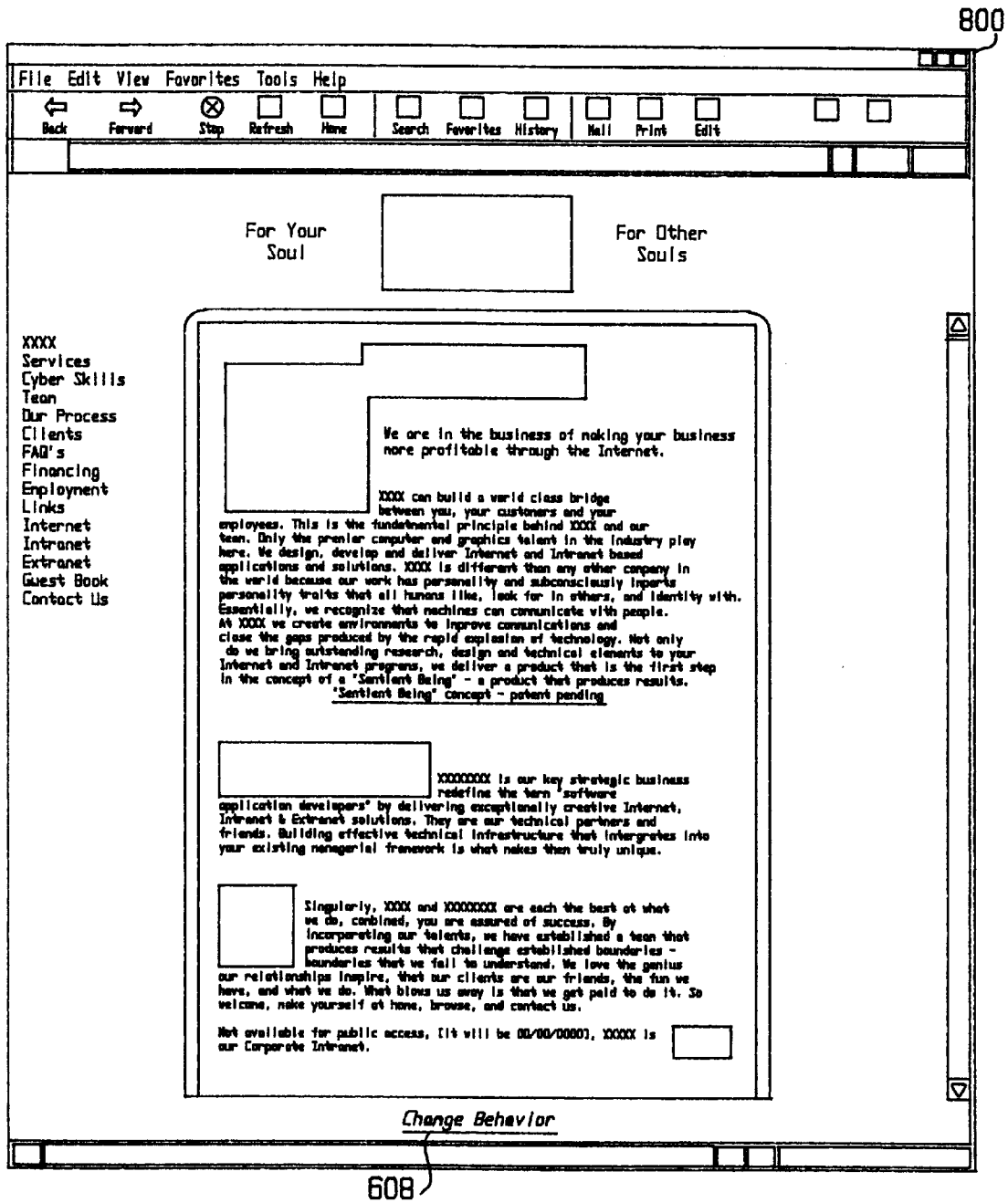

An amiable user sees a page such as the page 800 shown in FIG. 8. The page 800 sets forth information with more elaborate formatting. The "Change Behavior" link 608 is at the bottom.

Figure 9:
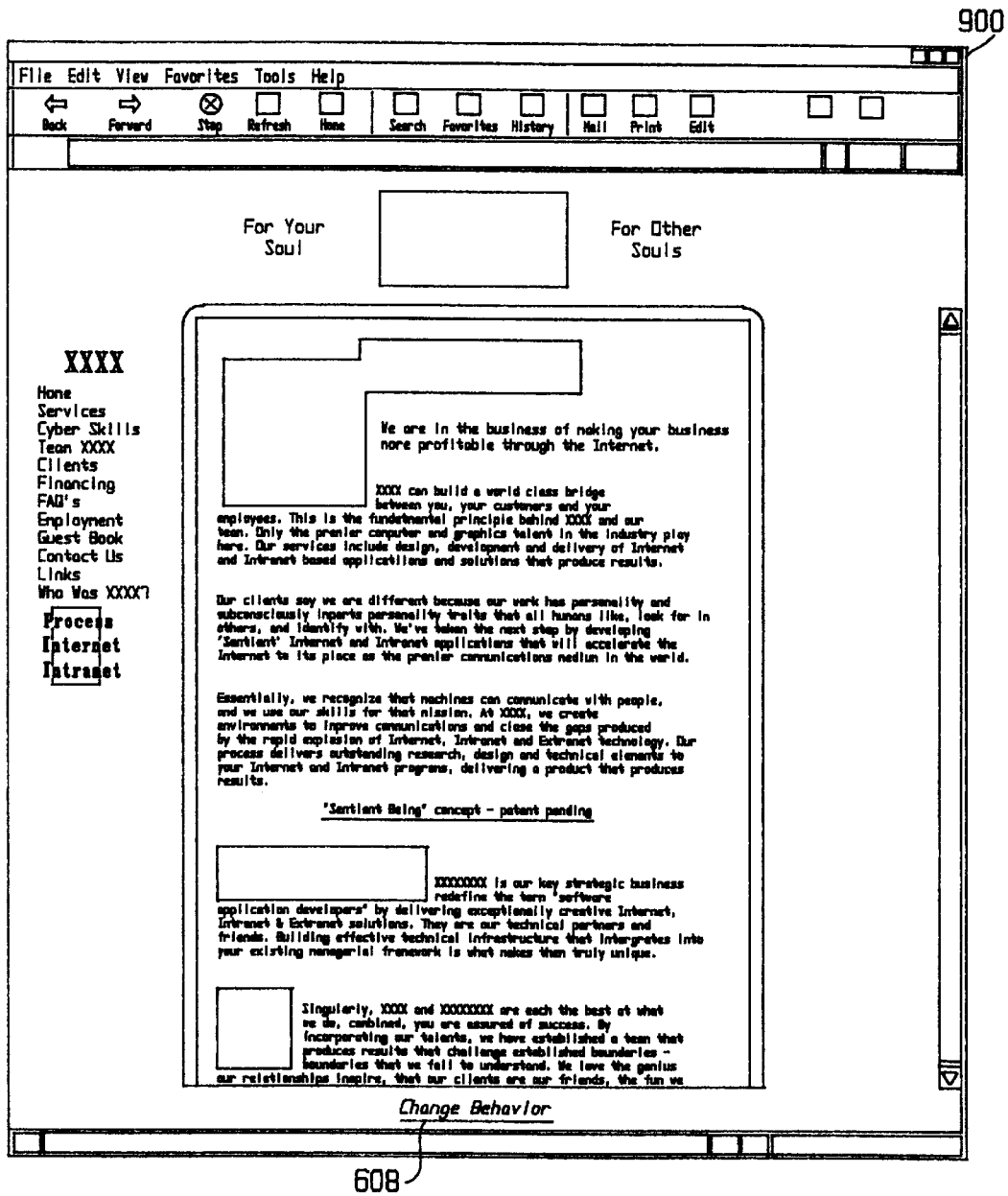

An expressive user sees a page such as the page 900 shown in FIG. 9. The page 900 sets forth information with still more elaborate formatting. The "Change Behavior" link 608 is at the bottom.

Of course, the specifics of formatting are shown for illustrative rather than limiting purposes, and those skilled in the art will readily appreciate that the differences among the behavior-specific pages 700, 800, 900 can be varied as needed. Also, whenever a list of links to the various personality types is to be provided, such a list can be provided directly by listing the available types, as shown in FIG. 6, or indirectly through a single "Change Behavior" link 608.

While a preferred embodiment has been set forth in detail above, those skilled in the art who have reviewed the present disclosure will readily appreciate that other embodiments can be realized within the scope of the invention. For example, while the preferred embodiment has been disclosed within the context of the World Wide Web, the invention can be implemented on an intranet, another type of network or even a stand-alone device. Also, while the user has been disclosed as having autonomy of choice, some sort of parental control can be implemented. Therefore, the present invention should be construed as limited only by the appended claims.

What is claimed is:

1. A system for presenting information to a user on a workstation operated by the user in accordance with a preference specified by the user through the workstation, the system comprising:
   a database server for storing the information; and
   an application server, in communication with the database server and the workstation, for receiving from the workstation a request for the information and an indication of the preference which has been specified by the user through the workstation, retrieving the information from the database server, dynamically formatting the information in accordance with the preference to form custom-formatted information and sending the custom-formatted information to the workstation.

2. The system of claim 1, wherein the application server presents to the user a home page providing links to a plurality of preferences to allow the user to specify the preference from among the plurality of preferences.

3. The system of claim 2, wherein the application server stores the preference in at least one file and retrieves the preference when the user makes an additional request for information.

4. The system of claim 3, wherein the at least one file comprises a cookie left on the workstation.

5. The system of claim 4, wherein:

when the user accesses the application server and the application server receives the cookie, the application server retrieves the preference in accordance with the cookie and forms the custom-formatted information in accordance with the preference thus retrieved; and when the user accesses the application server and the application server does not receive the cookie, the application server presents to the user the home page providing the links to the plurality of preferences.

6. The system of claim 1, wherein the custom-formatted information comprises a link to be clicked by the user to change the preference.

7. The system of claim 6, wherein, when the user changes the preference, the application server re-formats the custom-formatted information and subsequent information in accordance with the preference changed by the user.

8. The system of claim 6, wherein, when the user clicks the link to change the preference and specifies a changed preference, the application server immediately formats the information in accordance with the changed preference so that the user sees the information formatted in accordance with the changed preference immediately.

9. The system of claim 1, wherein:

the custom-formatted information is formatted as dynamic HTML; and the application server runs dynamic HTML server software and behavioral business objects for receiving the information from the database server and controlling the dynamic HTML server software to format the information as the dynamic HTML.

10. The system of claim 1, wherein the user accesses the database server only though the application server.

11. The system of claim 1, wherein:

the preference comprises a selection of a personality type from among a plurality of personality types; and the application server runs business objects representing the plurality of personality types and dynamically formats the information under control of the business objects in accordance with the personality type selected in the preference.

12. The system of claim 1, wherein the custom-formatted information comprises HTML code which varies in accordance with the preference specified by the user.

13. A method for presenting information to a user on a workstation operated by the user in accordance with a preference specified by the user through the workstation, the method comprising:

(a) storing the information;

(b) permitting the user to specify the preference through the workstation and receiving from the workstation a request for the information and an indication of the preference which has been specified by the user through the workstation;

(c) retrieving the information from a database server;

(d) dynamically formatting the information in accordance with the preference to form custom-formatted information; and (e) sending the custom-formatted information to the workstation.

14. The method of claim 13, wherein step (b) comprises:

(i) presenting to the user a home page providing links to a plurality of preferences to allow the user to specify the preference from among the plurality of preferences; and (ii) receiving the indication of the preference when the user selects a corresponding one of the links.

15. The method of claim 14, wherein step (b) further comprises:

(iii) storing the preference in at least one file; and (iv) retrieving the preference when the user makes an additional request for information.

16. The method of claim 15, wherein the at least one file comprises a cookie left on the workstation.

17. The method of claim 16, wherein:

when the cookie is received, step (b)(iv) comprises retrieving the preference in accordance with the cookie and, step (d) comprises forming the custom-formatted information in accordance with the preference thus retrieved; and when the cookie is not received, step (b)(i) is performed.

18. The method of claim 13, wherein the custom-formatted information comprises a link to be clicked by the user to change the preference.

19. The method of claim 18, further comprising, when the user changes the preference, re-formatting the custom-formatted information and subsequent information in accordance with the preference changed by the user.

20. The method of claim 18, wherein, when the user clicks the link to change the preference and specifies a changed preference, the information is immediately formatted in accordance with the changed preference so that the user sees the information formatted in accordance with the changed preference immediately.

21. The method of claim 13, wherein:

the custom-formatted information is formatted as dynamic HTML; and step (d) comprises formatting the information as the dynamic HTML in accordance with behavioral business objects.

22. The method of claim 13, wherein the user accesses the information stored in step (a) only through steps (b)–(e).

23. The method of claim 13, wherein:

the preference comprises a selection of a personality type from among a plurality of personality types; and step (d) comprises:

(i) providing business objects representing the plurality of personality types; and (ii) dynamically formatting the information under control of the business objects in accordance with the personality type selected in the preference.

24. The method of claim 13, wherein the custom-formatted information comprises HTML code which varies in accordance with the preference specified by the user.

* * * * *